C. EIBYE.
WINDSHIELD CLEARING DEVICE.
APPLICATION FILED NOV. 29, 1919.
1,403,545.
Patented Jan. 17, 1922.
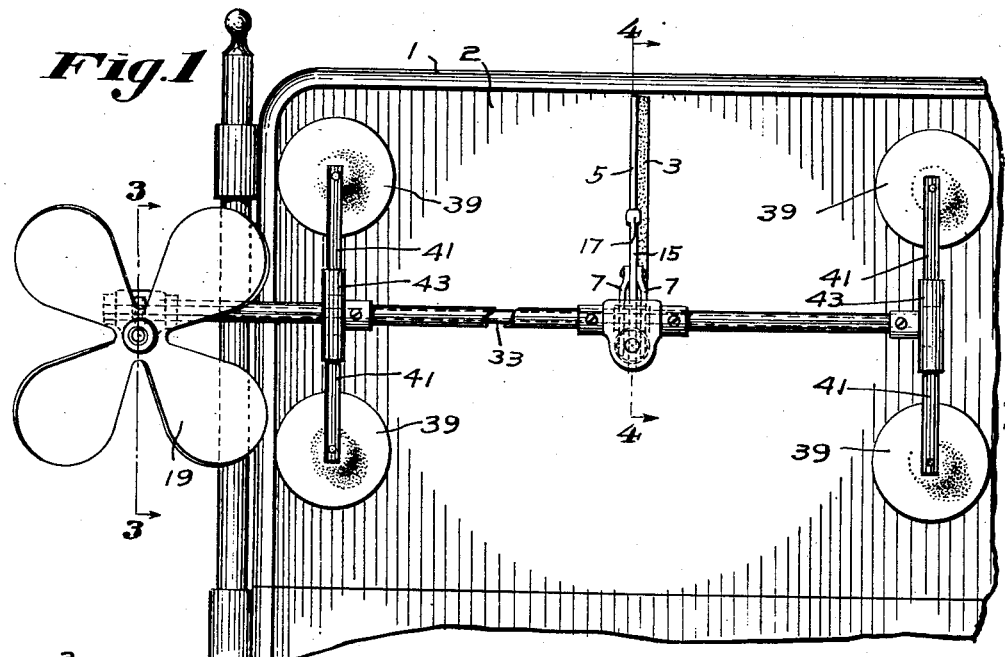
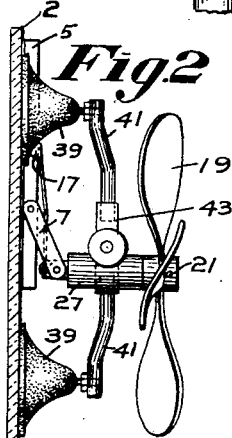
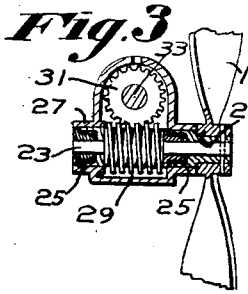
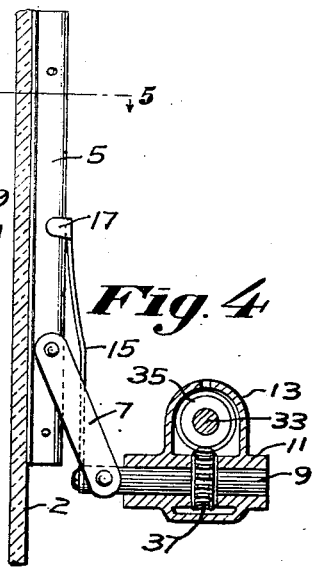
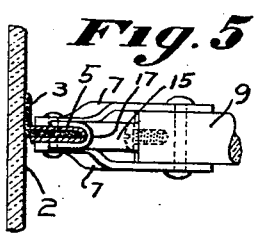
Inventor:
Carl Eibye
by Robt. A. Hains
Attorney

UNITED STATES PATENT OFFICE.

CARL EIBYE, OF BOSTON, MASSACHUSETTS, ASSIGNOR TO THE H & E CO., OF BOSTON, MASSACHUSETTS, A CORPORATION OF MAINE.

WINDSHIELD-CLEARING DEVICE.

1,403,545.     Specification of Letters Patent.     Patented Jan. 17, 1922.

Application filed November 29, 1919. Serial No. 341,482.

*To all whom it may concern:*

Be it known that I, CARL EIBYE, a citizen of the United States, residing at Boston, in the county of Suffolk and State of Massachusetts, have invented an Improvement in Windshield-Clearing Devices, of which the following description, in connection with the accompanying drawings, is a specification, like characters on the drawings representing like parts.

The invention to be hereinafter described, relates to devices for clearing rain and snow from wind shields of automobiles or other vehicles.

One of the purposes of the invention is to provide a simple and efficient device for automatically clearing rain and snow from a sufficient area of the wind shield to enable one to readily see therethrough.

Another purpose of the invention is to provide means detachably to secure the device in operative position on the wind shield, the construction being such that the device may be readily applied to or removed from the wind shield as desired.

Another purpose of the invention is to provide a wiping member for engagement with the glass of the wind shield, and a driving fan therefor imparting motion to the wiping member through a simple, silent and compact speed reduction transmission.

With the aforesaid and other objects in view, the character of the invention may be best understood by reference to the following description of one good form thereof shown in the accompanying drawing, wherein:

Fig. 1 is a front elevation of a portion of a wind shield equipped with a clearing device embodying the invention;

Fig. 2 is an end elevation of the clearing device;

Fig. 3 is a vertical section taken on line 3—3 of Fig. 1;

Fig. 4 is a vertical section taken on line 4—4 of Fig. 1; and

Fig. 5 is a transverse section taken on line 5—5 of Fig. 4.

The clearing device may be applied to any window or wind shield, but for purposes of illustration, it is shown in the drawing as applied to a wind shield of an automobile which may be of usual construction comprising a frame 1 and a glass 2 mounted therein.

The clearing device shown herein as one good form of the invention, comprises a wiping member, in the present instance, in the form of a rubber strip 3 mounted in a holder conveniently in the form of a channel 5.

The present invention contemplates that this wiping member shall receive a motion over the outer surface of the glass of the wind shield to maintain a portion thereof in clear condition. To accomplish this, the inner end of the wiping member may be connected by a pair of links 7 (Figs. 4 and 5) with a stub shaft 9 journalled in a boss bearing 11 extending transversely to a mounting conveniently in the form of a tube 13. It is desirable that the wiping member shall be yieldingly pressed against the outer face of the glass. To accomplish this, in the present instance, a leaf spring 15 is provided having one end secured to the stub shaft, and its other end provided with a shoe 17 adapted to engage the holder or channel 5, the construction being such that the wiping member is pressed constantly against the glass so as to insure efficient wiping engagement of the rubber strip 3 therewith.

The tube or mounting 13 is adapted to project along and parallel to the outer face of the glass and somewhat beyond one end of the wind shield. Suitable driving means may be provided for imparting the motion to the wiping member, this means, in the present instance, being in the form of a rotary fan 19 having a hub 21 mounted on a stub shaft 23 journalled on a ball bearing 25 mounted in a boss 27 mounted on and extending transversely to the tubular mounting 13.

It is desirable that the wiping member shall receive a slow rotary motion from the rapidly rotating fan. To accomplish this, in the present instance, the fan stub shaft 23 is provided with a worm 29 meshing with a worm gear 31 fast on a transmission shaft 33 enclosed within the tube 13 and journalled in bearings therein. This provides substantial speed reduction between the stub shaft 23 and the transmission shaft 33. To provide further speed reduction between the fan and the wiping member, the transmission shaft 33 may be provided with a worm 35 (Fig. 4) meshing with a worm gear 37 fast on the wiping member stub shaft 9.

The construction is such that the fan may be rotated at a high speed, and the wiping member may receive a slow rotary motion therefrom. The worm gear transmission not only produces a desirable speed reduction, but also enables the wiping member to be rotated with desirable mechanical advantage requiring a small amount of power. The worms and worm gears may be small in diameter, offering a compact transmission mechanism which may be housed in and protected by the tube 13 and transverse bosses 11 and 27. In fact, the construction may be so compact as to afford very slight obstruction of the wind shield or the view of the driver.

Suitable means may be provided to detachably secure the clearing device to the wind shield. This means, in the present instance, comprises a plurality of rubber vacuum cups 39 mounted at the outer ends of the arms 41, the inner ends of the latter being secured in T-unions 43 secured to the tubular mounting 13. The tubing may be of a length such that the unions, arms and vacuum cups may be located beyond the radius of motion of the wiping member, so as to avoid interference therewith.

When it is desired to apply the clearing device to a wind shield, it is merely necessary to present the device to the outer face of the glass of the wind shield, and to press the vacuum cups against the glass until they obtain secure gripping engagement therewith. When the wind is blowing against the fan, or the automobile is in motion, the fan will rotate, and through the transmission described will cause the wiping member to rotate over the outer surface of the wind shield and clear rain or snow therefrom, so as to enable the driver of the automobile readily to see through the wind shield. When the use of the clearing device is not required, it may readily be removed by pulling the vacuum cups from the glass. Then the device may be stored in any convenient place where it will be in readiness for use when required. The vacuum cups are a highly desirable means for connecting the device with the wind shield, not only because of the ease with which the device may be attached to and removed from the wind shield, but also because they enable the device to be directly mounted on the glass of the wind shield, and thus any relative motion between the wind shield and the post or other support therefor, will not disturb the efficient operative relation of the wiping member with the glass. Also, they dispense with the necessity of any brackets or other devices for connection with the frame of the wind shield or the supporting post therefor, and eliminate any disfigurement therefrom.

The clearing device described is simple, cheap and compact in construction, and efficient in operation.

While the device has been described more particularly with reference to its use on an automobile wind shield, it is not restricted thereto, but is adapted for application to windows for street cars and other vehicles.

It will be understood that the invention is not limited to the specific embodiment shown, and that various deviations may be made therefrom without departing from the spirit and scope of the appended claims.

What is claimed is:

1. A wind-shield clearing device, comprising, in combination, a driving shaft extending transversely relative to the wind-shield, a stub shaft, gearing connection between the driving shaft and stub shaft for rotating the latter, a wiper carried by the stub shaft, and a spring for causing the wiper to bear upon the wind-shield as it travels in its rotary path.

2. A wind-shield clearing device, comprising, in combination, a driving shaft, a stub shaft, gearing connections between the driving shaft and stub shaft for rotating the latter, a wiper, links connecting the wiper to the stub shaft and permitting movement of the wiper in a direction toward and from the wind-shield, and a spring connected to the stub shaft and bearing upon the wiper.

3. A wind-shield clearing device, comprising, in combination, a driving shaft, driving means for the shaft, a stub shaft cooperating with the driving shaft extending from the driving shaft toward the wind-shield, a wiper, links pivotally connected to the wiper and the stub shaft, and a spring secured to the stub shaft and bearing upon the wiper.

4. A wind-shield clearing device, comprising, in combination, a driving shaft extending transversely of and supported adjacent the wind-shield, means for driving the shaft, a stub shaft extending from the driving shaft toward the wind-shield, gear connections between the driving shaft and stub shaft, a casing surrounding the gear connections, a wiper, links connecting a projecting end portion of the stub shaft to the wiper and permitting manual movement of the wiper toward and from the wind-shield, and a spring secured to the stub shaft and bearing upon the wiper.

5. A wind shield clearing device, comprising, in combination, a tube mounting, a transmission shaft therein, a pair of stub shafts extending transversely to said transmission shaft, a fan for rotating one of said stub shafts, a wind shield wiping member rotated by the other stub shaft, gearing connecting said stub shafts with said transmission shaft, and means for securing said tube mounting on the wind shield.

6. A wind shield cleaning device comprising, in combination, a wiper adapted to move over the glass of the wind-shield, driving means, a stub shaft connected to said driving means, a worm on said stub shaft, a transmission shaft adapted to extend along the wind shield from said stub shaft towards said wiper, a gear on said transmission shaft meshing with said worm, a worm on said transmission shaft, a stub shaft connected to said wiper, a gear on the wiper shaft meshing with said worm, a compact casing enclosing said shaft, gears and worms without substantial obstruction to the wind shield, and means for supporting said casing adjacent said wind shield.

In testimony whereof, I have signed my name to this specification.

CARL EIBYE.